(12) United States Patent
Du

(10) Patent No.: US 11,706,246 B2
(45) Date of Patent: *Jul. 18, 2023

(54) IOT DEVICE RISK ASSESSMENT AND SCORING

(71) Applicant: Palo Alto Networks, Inc., Santa Clara, CA (US)

(72) Inventor: Jun Du, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,234

(22) Filed: Jun. 14, 2022

(65) Prior Publication Data

US 2022/0311799 A1 Sep. 29, 2022

Related U.S. Application Data

(63) Continuation of application No. 16/712,981, filed on Dec. 12, 2019, now Pat. No. 11,451,571.

(Continued)

(51) Int. Cl.
*H04L 29/00* (2006.01)
*H04L 9/40* (2022.01)
(Continued)

(52) U.S. Cl.
CPC .......... *H04L 63/1433* (2013.01); *H04L 63/20* (2013.01); *H04W 12/122* (2021.01); *H04W 12/67* (2021.01); *H04W 12/68* (2021.01)

(58) Field of Classification Search
CPC .. H04L 63/1433; H04L 63/20; H04W 12/122; H04W 12/67; H04W 12/68; H04W 4/70
See application file for complete search history.

(56) References Cited

U.S. PATENT DOCUMENTS 6,142,682 A 11/2000 Skogby
6,877,146 B1 4/2005 Teig
(Continued)

FOREIGN PATENT DOCUMENTS

CN 102025577 7/2012
CN 107862468 3/2018
(Continued)

OTHER PUBLICATIONS

Charu C. Aggarwal, Outlier Analysis, Retrieved from the Internet, URL: https://web.archive.org/web/20130210212057/http://charuaggarwal.net/outlierbook.pdf.
(Continued)

*Primary Examiner* — Don G Zhao
(74) *Attorney, Agent, or Firm* — Van Pelt, Yi & James LLP

(57) ABSTRACT

Techniques for establishing a risk score for Internet of Things (IoT) device parameters and acting in response thereto are disclosed. One or more data packets transmitted to or from an Internet of Things (IoT) device are analyzed to obtain event parameters. The event parameters are analyzed to determine a context of the IoT device. A behavior of the IoT device is determined based at least in part on the event parameters and the context. A progressive risk score is obtained for the IoT device. Subsequent to obtaining the progressive risk assessment score, the progressive risk assessment score is updated based at least in part on an analysis of one or more additional data packets.

20 Claims, 8 Drawing Sheets

Related U.S. Application Data

(60) Provisional application No. 62/778,810, filed on Dec. 12, 2018.

(51) Int. Cl.
*H04W 12/68* (2021.01)
*H04W 12/122* (2021.01)
*H04W 12/67* (2021.01)

(56) References Cited

U.S. PATENT DOCUMENTS

| | | |
|---|---|---|
| 8,146,133 B2 | 3/2012 | Moon |
| 8,159,966 B1 | 4/2012 | Mabee |
| 8,331,229 B1 | 12/2012 | Hu |
| 8,671,099 B2 | 3/2014 | Kapoor |
| 8,683,598 B1 | 3/2014 | Cashin |
| 8,850,588 B2 | 9/2014 | Kumar |
| 8,874,550 B1 | 10/2014 | Soubramanien |
| 8,891,528 B2 | 11/2014 | Moriarty |
| 8,898,788 B1 | 11/2014 | Ashar |
| 8,973,088 B1 | 3/2015 | Leung |
| 9,324,119 B2 | 4/2016 | Singh |
| 9,516,053 B1 | 12/2016 | Muddu |
| 9,548,987 B1 | 1/2017 | Poole |
| 9,584,536 B2 | 2/2017 | Nantel |
| 9,600,571 B2 * | 3/2017 | Shaashua ............. H04L 67/12 |
| 9,609,003 B1 | 3/2017 | Chmielewski |
| 9,661,011 B1 | 5/2017 | Van Horenbeeck |
| 9,692,784 B1 | 6/2017 | Nenov |
| 9,774,604 B2 | 9/2017 | Zou |
| 9,807,110 B2 | 10/2017 | Harlacher |
| 9,891,907 B2 | 2/2018 | Searle |
| 9,961,096 B1 | 5/2018 | Pierce |
| 9,984,344 B2 | 5/2018 | Singh |
| 10,038,700 B1 | 7/2018 | Duchin |
| 10,043,591 B1 * | 8/2018 | LaBorde ............... G16H 10/65 |
| 10,122,747 B2 | 11/2018 | Mahaffey |
| 10,191,794 B2 * | 1/2019 | Smith ............... G06F 11/0751 |
| 10,204,312 B2 | 2/2019 | Singh |
| 10,212,176 B2 | 2/2019 | Wang |
| 10,212,178 B2 | 2/2019 | Cheng |
| 10,229,269 B1 | 3/2019 | Patton |
| 10,237,875 B1 | 3/2019 | Romanov |
| 10,320,613 B1 | 6/2019 | Cam-Winget |
| 10,348,739 B2 | 7/2019 | Greenspan |
| 10,459,827 B1 | 10/2019 | Aghdaie |
| 10,489,361 B2 | 11/2019 | Sisk |
| 10,511,620 B2 | 12/2019 | Schwartz |
| 10,623,389 B2 * | 4/2020 | Childress ............... H04L 63/08 |
| 10,630,728 B2 * | 4/2020 | Ghosh .................. H04W 12/02 |
| 10,764,315 B1 | 9/2020 | Carroll |
| 10,885,393 B1 | 1/2021 | Sirianni |
| 10,887,306 B2 * | 1/2021 | Gupta ................ H04L 63/0853 |
| 11,005,839 B1 * | 5/2021 | Shahidzadeh ........ H04W 12/06 |
| 11,070,568 B2 | 7/2021 | Ektare |
| 11,115,799 B1 | 9/2021 | Du |
| 11,310,247 B2 | 4/2022 | Manadhata |
| 11,455,641 B1 | 9/2022 | Shahidzadeh |
| 2004/0243835 A1 | 12/2004 | Terzis |
| 2006/0265397 A1 | 11/2006 | Bryan |
| 2008/0059536 A1 | 3/2008 | Brock |
| 2010/0284282 A1 | 11/2010 | Golic |
| 2012/0065749 A1 | 3/2012 | Hunter |
| 2012/0102543 A1 | 4/2012 | Kohli |
| 2012/0240185 A1 | 9/2012 | Kapoor |
| 2013/0086261 A1 | 4/2013 | Lim |
| 2013/0173621 A1 | 7/2013 | Kapoor |
| 2013/0247190 A1 | 9/2013 | Spurlock |
| 2013/0305357 A1 | 11/2013 | Ayyagari |
| 2014/0006479 A1 | 1/2014 | Maloo |
| 2014/0244834 A1 * | 8/2014 | Guedalia ............... H04W 4/08 709/224 |
| 2014/0281912 A1 | 9/2014 | Doi |
| 2014/0325670 A1 | 10/2014 | Singh |
| 2014/0337862 A1 | 11/2014 | Valencia |
| 2015/0039513 A1 | 2/2015 | Adjaoute |
| 2015/0055623 A1 | 2/2015 | Li |
| 2015/0161024 A1 | 6/2015 | Gupta |
| 2015/0229654 A1 | 8/2015 | Perier |
| 2015/0262067 A1 | 9/2015 | Sridhara |
| 2015/0271192 A1 | 9/2015 | Crowley |
| 2015/0293954 A1 | 10/2015 | Hsiao |
| 2015/0295945 A1 | 10/2015 | Canzanese, Jr. |
| 2015/0324559 A1 | 11/2015 | Boss |
| 2015/0356451 A1 | 12/2015 | Gupta |
| 2016/0028750 A1 | 1/2016 | Di Pietro |
| 2016/0036819 A1 | 2/2016 | Zehavi |
| 2016/0048984 A1 | 2/2016 | Frigo |
| 2016/0119372 A1 | 4/2016 | Borlick |
| 2016/0128043 A1 | 5/2016 | Shuman |
| 2016/0173446 A1 | 6/2016 | Nantel |
| 2016/0173495 A1 * | 6/2016 | Joo ..................... H04L 63/1425 713/171 |
| 2016/0182497 A1 | 6/2016 | Smith |
| 2016/0196558 A1 | 7/2016 | Mercille |
| 2016/0212099 A1 * | 7/2016 | Zou ..................... H04L 63/0263 |
| 2016/0218949 A1 | 7/2016 | Dasgupta |
| 2016/0261465 A1 | 9/2016 | Gupta |
| 2016/0267406 A1 | 9/2016 | Bodo |
| 2016/0267408 A1 | 9/2016 | Singh |
| 2016/0277435 A1 | 9/2016 | Salajegheh |
| 2016/0301707 A1 * | 10/2016 | Cheng ..................... H04L 67/12 |
| 2016/0301717 A1 | 10/2016 | Dotan |
| 2016/0337127 A1 | 11/2016 | Schultz |
| 2016/0352685 A1 | 12/2016 | Park |
| 2016/0366141 A1 | 12/2016 | Smith |
| 2016/0366181 A1 | 12/2016 | Smith |
| 2017/0006028 A1 | 1/2017 | Tunnell |
| 2017/0006135 A1 * | 1/2017 | Siebel .................... G06F 8/10 |
| 2017/0011406 A1 * | 1/2017 | Tunnell ................ G06Q 20/308 |
| 2017/0013005 A1 | 1/2017 | Galula |
| 2017/0055913 A1 | 3/2017 | Bandyopadhyay |
| 2017/0063774 A1 | 3/2017 | Chen |
| 2017/0093915 A1 * | 3/2017 | Ellis ...................... H04L 63/104 |
| 2017/0118237 A1 | 4/2017 | Devi Reddy |
| 2017/0118240 A1 | 4/2017 | Devi Reddy |
| 2017/0124660 A1 * | 5/2017 | Srivastava ............. G06Q 40/08 |
| 2017/0126704 A1 * | 5/2017 | Nandha Premnath ....................... G06F 21/566 |
| 2017/0149813 A1 * | 5/2017 | Wright .................. G06F 21/552 |
| 2017/0180380 A1 | 6/2017 | Bagasra |
| 2017/0180399 A1 | 6/2017 | Sukhomlinov |
| 2017/0188242 A1 | 6/2017 | Ghosh |
| 2017/0200061 A1 * | 7/2017 | Julian ................. G07C 5/0866 |
| 2017/0230402 A1 | 8/2017 | Greenspan |
| 2017/0232300 A1 * | 8/2017 | Tran ...................... A63B 71/06 434/247 |
| 2017/0235585 A1 * | 8/2017 | Gupta ..................... H04L 41/12 718/1 |
| 2017/0235783 A1 | 8/2017 | Chen |
| 2017/0244737 A1 | 8/2017 | Kuperman |
| 2017/0251007 A1 | 8/2017 | Fujisawa |
| 2017/0272554 A1 | 9/2017 | Kwan |
| 2017/0279685 A1 | 9/2017 | Mota |
| 2017/0289184 A1 | 10/2017 | C |
| 2017/0331671 A1 | 11/2017 | Olsson |
| 2017/0331906 A1 | 11/2017 | Choi |
| 2017/0339178 A1 | 11/2017 | Mahaffey |
| 2017/0344407 A1 | 11/2017 | Jeon |
| 2017/0346677 A1 | 11/2017 | Suryanarayana |
| 2018/0007058 A1 | 1/2018 | Zou |
| 2018/0012227 A1 | 1/2018 | Tunnell |
| 2018/0018684 A1 * | 1/2018 | Orr ....................... G06N 20/00 |
| 2018/0027006 A1 | 1/2018 | Zimmermann |
| 2018/0078843 A1 * | 3/2018 | Tran ................... G09B 19/0038 |
| 2018/0115574 A1 | 4/2018 | Ridley |
| 2018/0117446 A1 * | 5/2018 | Tran ...................... A42B 3/0433 |
| 2018/0117447 A1 * | 5/2018 | Tran ..................... G06Q 20/382 |
| 2018/0139227 A1 | 5/2018 | Martin |
| 2018/0144139 A1 * | 5/2018 | Cheng ................. H04L 63/0227 |
| 2018/0191729 A1 | 7/2018 | Whittle |
| 2018/0191746 A1 * | 7/2018 | De Knijf ............. H04L 43/0876 |
| 2018/0191848 A1 | 7/2018 | Bhattacharya |
| 2018/0205793 A1 * | 7/2018 | Loeb ..................... G06T 19/003 |

(56) References Cited

U.S. PATENT DOCUMENTS

| | | | |
|---|---|---|---|
| 2018/0212768 A1 | 7/2018 | Kawashima | |
| 2018/0234302 A1 | 8/2018 | James | |
| 2018/0234519 A1 | 8/2018 | Boyapalle | |
| 2018/0248902 A1 | 8/2018 | Dānilā-Dumitrescu | |
| 2018/0255084 A1 | 9/2018 | Kotinas | |
| 2018/0261070 A1 | 9/2018 | Stevens | |
| 2018/0264347 A1* | 9/2018 | Tran | A63B 43/004 |
| 2018/0285234 A1 | 10/2018 | Degaonkar | |
| 2018/0293387 A1* | 10/2018 | Bar-El | H04L 63/123 |
| 2018/0295148 A1* | 10/2018 | Mayorgo | H04L 63/20 |
| 2018/0302440 A1 | 10/2018 | Hu | |
| 2018/0349598 A1* | 12/2018 | Harel | G06F 11/3668 |
| 2018/0349612 A1* | 12/2018 | Harel | G06F 11/0793 |
| 2018/0357556 A1 | 12/2018 | Rai | |
| 2018/0375887 A1* | 12/2018 | Dezent | H04L 41/142 |
| 2019/0019249 A1* | 1/2019 | Bhattacharjee | G06Q 40/025 |
| 2019/0081961 A1* | 3/2019 | Bansal | H04L 67/10 |
| 2019/0089747 A1 | 3/2019 | Wang | |
| 2019/0098028 A1* | 3/2019 | Ektare | H04L 63/1416 |
| 2019/0098058 A1 | 3/2019 | Ikegami | |
| 2019/0109717 A1* | 4/2019 | Reddy | H04L 63/20 |
| 2019/0121978 A1 | 4/2019 | Kraemer | |
| 2019/0138512 A1 | 5/2019 | Pourmohammad | |
| 2019/0182278 A1* | 6/2019 | Das | H04L 63/1425 |
| 2019/0268305 A1 | 8/2019 | Xu | |
| 2019/0349426 A1* | 11/2019 | Smith | H04L 9/0825 |
| 2019/0361917 A1* | 11/2019 | Tran | G06Q 20/308 |
| 2019/0373472 A1 | 12/2019 | Smith | |
| 2019/0387399 A1* | 12/2019 | Weinberg | H04L 63/1425 |
| 2020/0036603 A1 | 1/2020 | Nieves | |
| 2020/0076846 A1* | 3/2020 | Pandian | G06F 3/04817 |
| 2020/0076853 A1* | 3/2020 | Pandian | G16H 30/20 |
| 2020/0117690 A1* | 4/2020 | Tran | G06F 16/90332 |
| 2020/0156654 A1* | 5/2020 | Boss | A61B 5/12 |
| 2020/0162278 A1* | 5/2020 | Delaney | H04L 12/2816 |
| 2020/0177485 A1* | 6/2020 | Shurtleff | H04L 67/12 |
| 2020/0177589 A1 | 6/2020 | Mangalvedkar | |
| 2020/0213146 A1 | 7/2020 | Kodam | |
| 2020/0409957 A1 | 12/2020 | Zhang | |

FOREIGN PATENT DOCUMENTS

| | | |
|---|---|---|
| CN | 108650133 | 10/2018 |
| CN | 107135093 | 5/2020 |
| CN | 108306911 | 12/2020 |
| EP | 3136297 | 3/2017 |
| JP | 2018513467 | 5/2018 |
| WO | 2019218874 | 11/2019 |

OTHER PUBLICATIONS

Arash Fasihi, Rule Based Inference and Action Selection Based on Monitoring Data in IoT, Dec. 1, 2015.

Cramer et al., Detecting Anomalies in Device Event Data in the IoT, Proceedings of the 3td International Conference on Internet of Things, Big Data and Security, Mar. 21, 2018, pp. 52-62.

Midi et al., Kalis—A System for Knowledge-driven Adaptable Intrusion Detection for the Internet of Things, 2017 IEEE 37th International Conference on Distributed Computing Systems, pp. 656-666.

Al-Shaer et al., Design and Implementation of Firewall Policy Advisor Tools, 2002.

Al-Shaer et al., Firewall Policy Advisor for Anomaly Discovery and Rule Editing, Integrated Network Management VIII, 2003.

Author Unknown, Cisco Encrypted Traffic Analytics, Feb. 10, 2021.

Blackstock et al., IoT Interoperability: A Hub-based Approach, 2014, IEEE International Conference on the Internet of Things (IOT), pp. 80-84.

Charyyev et al., Locality-Sensitive IoT Network Traffic Fingerprinting for Device Identification, IEEE Internet of Things Journal, 2020, vol. 8, No. 3, pp. 1272-1281.

Du et al., A Lightweight Flow Feature-Based IoT Device Identification Scheme, Security and Communication Networks, 2022.

Fredj et al., A Scalable IoT Service Search Based on Clustering and Aggregation, 2013 IEEE International Conference on Green Computing and Communication and IEEE Internet of Things and IEEE Cyber, Physical and Social Computing, pp. 1-8.

International Application No. PCT/US2016/025661, International Search Report and Written Opinion dated Jul. 7, 2016.

Li et al., A Distributed Consensus Algorithm for Decision Making in Service-Oriented Internet of Things, Old Dominion University, ODU Digital Commons, 2014.

Liu et al., A Lightweight Anomaly Mining Algorithm in the Internet of Things, 2014 IEEE 5th International Conference on Software Engineering and Service Science, 2014, pp. 1142-1145.

Martin et al., Requirements and Recommendations for CWE Compatibility and CWE Effectiveness, Version 1.0, Jul. 28, 2011.

Miloslavskaya et al., Ensuring Information Security for Internet of Things, 2017, IEEE 5th International Conference of Future Internet of Things and Cloud, pp. 62-69.

National Electrical Manufacturers Association, Manufacturer Disclosure Statement for Medical Device Security, HIMSS/NEMA Standard HN Jan. 2013, 2013.

Nguyen et al., A Software-Defined Model for IoT Clusters: Enabling Applications on Demand, Faculty of Engineering and IT, University of Technology Sydney, Australia, IEEE Xplore, Apr. 23, 2018.

Sivanathan et al., Classifying IoT Devices in Smart Environments Using Network Traffic Characteristics, IEEE, TMC, No. 8, pp. 1745-1759, Aug. 2018.

Sivanathan et al., Detecting Behavioral Change of IoT Devices Using Clustering-Based Network Traffic Modeling, IEEE LCN 2019, Mar. 30, 2020.

Sivanathan et al., Inferring IoT Device Types from Network Behavior Using Unsupervised Clustering, IEEE ICN 2019, Oct. 2019.

Zhao et al., A Few-Shot Learning Based Approach to IoT Traffic Classification, IEEE Communications Letters, 2021.

Chen et al., A Model-Based Validated Autonomic Approach to Self-Protect Computing Systems, IEEE Internet of Things Journal, Oct. 2014, pp. 446-460, vol. 1, No. 5.

* cited by examiner

IOT DEVICE RISK ASSESSMENT AND SCORING

CROSS-REFERENCE TO RELATED APPLICATIONS

The present application is a continuation of U.S. patent application Ser. No. 16/712,981 filed Dec. 12, 2019 and entitled "Iot Device Risk Assessment and Scoring," which claims priority to U.S. Provisional Patent Application Ser. No. 62/778,810 filed Dec. 12, 2018 and entitled "IoT Device Risk Modeling," each of which is hereby incorporated by reference herein.

DETAILED DESCRIPTION

Figure 1:
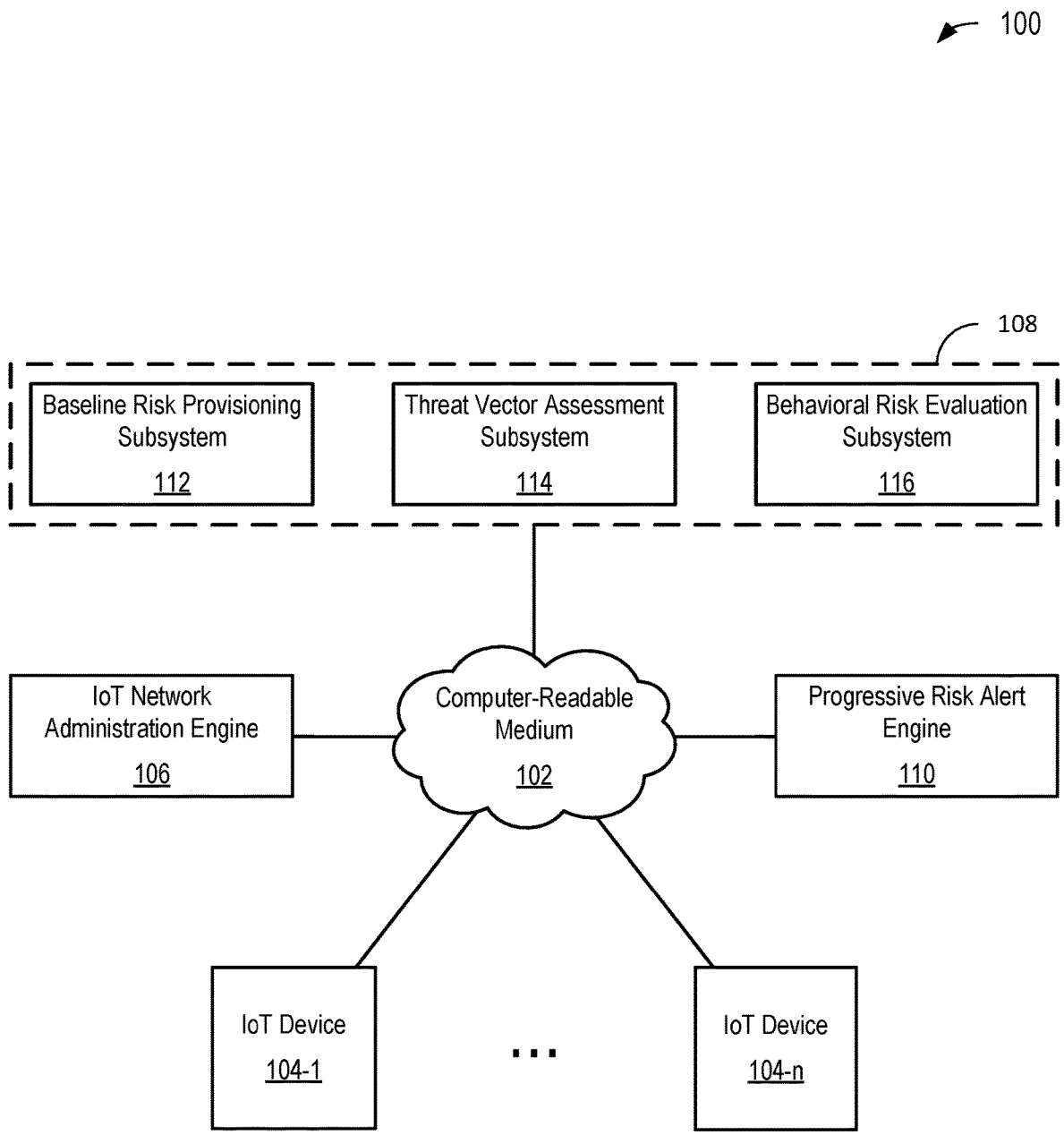
FIG. 1 depicts a diagram of an example of a system for establishing a risk score for Internet of Things (IoT) device parameters and acting in response thereto.

FIG. 1 depicts a diagram 100 of an example of a system for establishing a risk score for Internet of Things (IoT) device parameters and acting in response thereto. The diagram 100 includes a computer-readable medium 102, IoT device 104-1 . . . 104-n (hereinafter referred to as "IoT devices 104") coupled to the computer-readable medium 102, an IoT network administration engine 106 coupled to the computer-readable medium 102, a progressive risk assessment system 108 coupled to the computer-readable medium 102, and a progressive risk alert engine 110 coupled to the computer-readable medium 102. The progressive risk assessment system 108 includes a baseline risk provisioning subsystem 112, a threat vector assessment subsystem 114, and a behavioral risk evaluation subsystem 116.

The computer-readable medium 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 and other computer readable mediums discussed in this paper are intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O)

devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning to the example of FIG. 1, the IoT devices 104 are intended to represent devices with wired or wireless interfaces through which the IoT devices 104 can send and receive data over wired or wireless connections. Examples of IoT devices include thermostats, mobile devices, biological managers, sensory devices, and functionality performing devices. The IoT devices 104 can include unique identifiers which can be used in the transmission of data through a network. Unique identifiers of the IoT devices 104 can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference. Depending upon implementation-specific or other considerations, the IoT devices 104 can include applicable communication interfaces for receiving and sending data according to an applicable wireless device protocol. Examples of applicable wireless device protocols include Wi-Fi, ZigBee®, Bluetooth®, and other applicable low-power communication standards.

In a specific implementation, the IoT devices 104 act as stations. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the IoT devices 104 are configured to access network services in compliance with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, the IoT devices 104 are purposefully built or configured IoT devices. In being purposely built IoT devices, the IoT devices 104 are built to have specific operational parameters. For example, a thermometer may be built to provide signals from a temperature sensor. In being purposely configured IoT devices, the IoT devices 104 can be configured to operate according to specific operational parameters in accordance with input from a human or artificial agent. For example, an IoT device of the IoT devices 104 can be a thermostat configured to control an air conditioner to cool a room to a configurable temperature at a configurable time. As another example, an agent can specify an IoT device should not communicate with a specific data source, and the IoT device can be configured to refrain from communicating with the specific data source as part of purposeful configuration.

In the example of FIG. 1, the IoT network administration engine 106 is intended to represent an engine that implements network policies for, monitors network activity of, and reacts to alerts associated with the IoT devices 104. In a specific implementation, the network administration engine 106 includes a human-readable interface (e.g., a graphical user interface (GUI)) to facilitate providing data to and/or receiving instructions from a human agent.

In the example of FIG. 1, the progressive risk assessment system 108, which can alternatively be referred to as the progressive risk assessment engine 108, is intended to represent a system that understands domain-specific context and uses machine learning to generate additional domain knowledge. A context of an IoT device, as used herein, includes IoT device profiles, IoT device categories, and applicable operational parameters of an IoT device in operation, to name a few. For example, an IoT device can be profiled as a thermostat and categorized as a General Electric product. Context can include an ID of an IoT device, sources (or paths) of messages to an IoT device, destinations (or paths) of messages from an IoT device, current operational parameters of an IoT device (e.g., how an IoT device operates in controlling itself), behaviors of an IoT device in operation, whether an IoT device is actually operating, data ports used by an IoT device in sending and receiving data, types of data sent or received, operating systems used by an IoT device, and applications used by an IoT device. Further, a context of an IoT device can include applicable operational parameters of an IoT device in operation to either or both access network services and broadcast. For example, a context of an IoT device can include a message an IoT device broadcasts in acting as a beacon. In another example, a context of an IoT device can include a data source with which an IoT device communicates through a WAN.

In a specific implementation, at least a portion of the progressive risk assessment system 108 is implemented remotely relative to IoT devices for which the system determines risk levels. For example, at least a portion of the progressive risk assessment system 108 can be implemented as cloud based systems. Portions of the progressive risk assessment system 108 implemented remotely relative to IoT devices can receive data associated with the IoT devices through virtual private network (hereinafter "VPN") tunnels. For example, the progressive risk assessment system 108 can receive outbound network traffic sent from IoT devices over a VPN tunnel. Additionally, VPN tunnels through which the progressive risk assessment system 108 can send and receive data can be maintained using dedicated networking equipment. For example, the progressive risk assessment system 108 can receive data associated with the IoT devices 104 using dedicated routers for communicating with the IoT devices 104.

Instead or in addition, at least a portion of the progressive risk assessment system 108 can be implemented through a mirror in a gateway, one or more local agents, or on one or more IoT devices; i.e., intelligence can be distributed. A local agent includes software implemented on a physical device locally coupled to IoT devices. Local coupling involves operationally connecting the local agent via a LAN interface (or a smaller network interface, such as a PAN interface) to IoT devices. It should be noted enterprise networks can include geographically distributed LANs coupled across WAN segments. In a distributed enterprise network, the local agents may be local at each LAN (each LAN is sometimes referred to as a Basic Service Set (BSS) in IEEE 802.11 parlance, though no explicit requirement is suggested here) or localized using, e.g., VLAN tunneling (the connected LANs are sometimes referred to as an Extended Service Set (ESS) in IEEE 802.11 parlance, though no explicit requirement is suggested here). Depending upon implementation-specific or other considerations, the progressive risk assessment system 108 can include wired communication interfaces and wireless communication interfaces for communicating over wired or wireless communication channels. The progressive risk assessment system 108 can be, at least in part, a device provided by an Internet service provider directly purchased by a consumer and acting as a conduit between networks. Depending upon implementation or other considerations, the progressive risk assessment system 108 can be implemented as part of a private cloud. A private cloud implementing the progressive risk assessment system 108, at least in part, can be specific to an entity.

In a specific implementation, the progressive risk assessment system 108 functions to determine undesired behavior in IoT device operation, or otherwise abnormal IoT device behavior in operation, as described in more detail later. Undesired behavior is defined by an institutional or security system as undesirable. It may be noted that an IoT device with a good personality can exhibit anomalous behavior and still be considered to have a good personality, and an IoT device with a bad personality need not exhibit anomalous behavior to still be considered to have a bad personality. This is made of note because techniques used to identify undesired behavior can include anomaly detection, but anomaly detection is not the universe of undesired behavior detection. As used in this paper, a personality includes mathematically modelled behavior patterns, with institutional knowledge built into the personality model. Examples of bad personality include behavior associated with bots, C&C centers (botnet), or servers taken over by malware, to name three, all of which can have recognizable behaviors.

In the example of FIG. 1, the progressive risk alert engine 110 is intended to represent an engine that generates alerts for use by the IoT network administration engine 106 for the purpose of administering a network to which the IoT devices 104 are coupled and for use by the progressive risk assessment system 108 in, e.g., improving risk models. As such, the progressive risk score can be characterized as a correlation of baseline risk, threat intelligence, and event-based behavioral risk, which were discussed above, in addition to event-related threat alerts and incident-based alerts, which are discussed below. As used in this paper, alerts are indicative of malicious acts (e.g., exploiting too many open ports to breach security). The OWASP Top 10 application security risks—2017, which is incorporated by reference, provides examples of what should raise an alert. For example, "Injection flaws, such as SQL, NoSQL, OS, and LDAP injection, occur when untrusted data is sent to an interpreter as part of a command or query. The attacker's hostile data can trick the interpreter into executing unintended commands or accessing data without proper authorization."

In a specific implementation, the progressive risk alert engine 110 generates event-related threat alerts in response to policy violation or threat alerts (e.g., potential attack in notification). Policy violation and/or threat alerts may or may not increase a progressive risk score, depending upon the perceived risk associated with the non-incident alerts. As used in this paper, policy violation and threat alerts are "non-incidents" in that they are generated in response to something other than a modification of a device on a network. The confidence with which a threat alert can be indicative of an attack can be treated as somewhere between 1% and 99% (where 0% would trigger no alert at all and 100% would mean actual modification is detected on a device). Presumably, incident alerts, which indicate a device has been subjected to unauthorized modification and which would be considered when updating the progressive risk score at the progressive risk assessment system 108, trigger some form of countermeasures. It should be mentioned, however, that because some devices are more important than others, higher alert severity is correlated with incident alerts, but is but not determined by whether an incident or non-incident alert is generated.

The activities leading up to an incident can include network enumeration, vulnerability analysis, and exploitation. Network enumeration is the discovery of hosts or devices on a network. Network enumeration tends to use overt discovery protocols such as ICMP and SNMP to gather information (a network scan). It may also scan various ports on remote hosts for looking for well-known services (a service scan) in an attempt to further identify the function of a remote host. Vulnerability analysis is used to discover the weaknesses of a network using authenticated and/or unauthenticated scans (a vulnerability scan). Exploitation is attempting to compromise a system by employing the vulnerabilities found through vulnerability analysis. Network enumeration and vulnerability analysis may be referred to collectively as "recon." Recon is generally required before exploitation can occur, but could conceivably be skipped if a threat actor, such as an attacker, knew the network or performed "physical access recon." An initiator is a device that performs network enumeration, vulnerability analysis, and/or exploitation (and/or code drop, C&C, or launch). A responder is a device that responds to the initiator, but when a code drop occurs, a responder can be considered to have been converted into an initiator.

In a specific implementation, the progressive risk alert engine 110 monitors both an initiator and a responder (or at least communications therebetween) and, depending upon priorities and rules, generates non-incident alerts of variable severity (e.g., info, caution, warning, and danger) when spotting potential network enumeration, vulnerability analysis, and/or exploitation attempts or other undesirable activity. As was discussed previously, events need not be discrete. For example, each of the following events may not have an associated risk, but in the aggregate can be associated with risk: 1) a user login with username and email to create an account, 2) server sends token that is used for future login, 3) update email address (which could be that of a cracker) when see token, 4) server updates email with new email address. For this example aggregated event, it would be desirable, for example, to put in a check to prevent takeover.

In a specific implementation, the progressive risk alert engine 110 monitors both an initiator and a responder (or at least communications therebetween) and, depending upon priorities and rules, generates incident alerts of variable severity (e.g., info, caution, warning, and danger) when spotting unauthorized code drops, command & control (C&C), or a responder launching as an initiator. An example of a code drop is infection with a bot (usually delivered via a Trojan or exploit kit. Some examples of C&C botnets are telnet botnets, IRC-based botnets, and P2P botnets.

In a specific implementation, the progressive risk alert engine 110 generates and updates a progressive risk score using activity graphs. Recognizing each activity has a sequence of events (e.g., updating software involves locating a site, opening a connection, downloading, . . . ), at least conceptually a risk graph can be created for each activity. Reinforcement learning provides reward points for a path of an activity graph. For example, each behavior can have a behavior risk score. A behavior risk score is a weighted sum of associated activity risk scores; an activity risk score is a sum of reward points acquired at each event in a defining sequence of events. In practice, an agent (evaluator) makes an immediate decision about a reward. For certain factors, the reward is a relative value compared to other factors. Reward points can be calculated or predicted using a model (e.g., probability of spam if using email, probability of phishing attack in email, etc.). Advantageously, reward points, once added, are relatively stable, so you don't generally have to go back to change old risk factors. More detail regarding reward points is discussed below with respect to FIG. 5.

In the example of FIG. 1, the baseline risk provisioning subsystem 112, which comprises a baseline risk provisioning engine, is intended to represent a subsystem that provides a baseline risk assessment score for use by the progressive risk assessment system 108. More detail regarding the baseline risk provisioning subsystem 112 is discussed below with respect to FIG. 2.

In the example of FIG. 1, the threat vector assessment subsystem 114, which comprises a threat vector assessment engine, is intended to represent a system that converts indexed threat parameters to a baseline threat assessment score. More detail regarding the threat vector assessment subsystem 114 is discussed below with respect to FIG. 3.

In the example of FIG. 1, the behavioral risk evaluation subsystem 116, which comprises a behavioral risk evaluation engine, is intended to represent a system that converts predicted risk parameters to a qualitative behavioral risk score. More detail regarding the behavioral risk evaluation subsystem 116 is discussed below with respect to FIG. 4.

In a specific implementation, the progressive risk assessment system 108 functions to correlate risk factors from the baseline risk provisioning subsystem 112, the threat vector assessment subsystem 114, and the behavioral risk evaluation subsystem 116 to generate a progressive risk assessment score.

Figure 2:
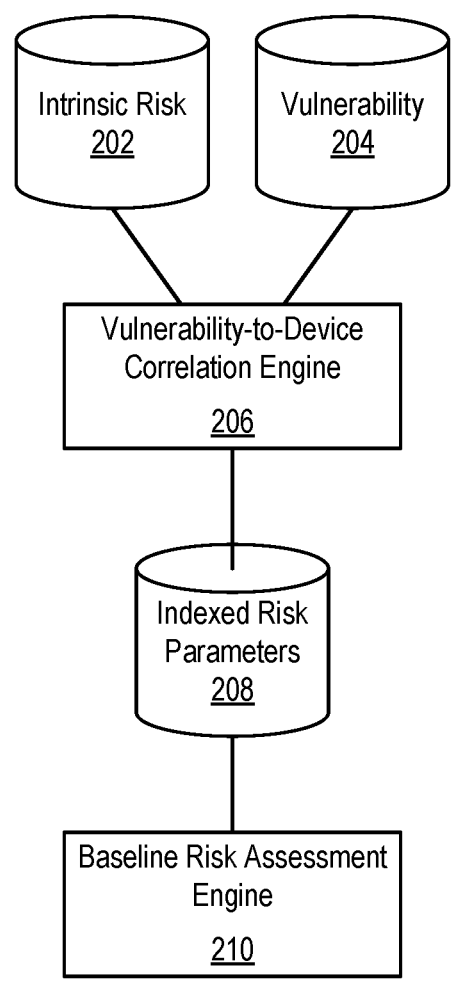
FIG. 2 depicts a diagram of an example of a baseline risk provisioning system.

FIG. 2 depicts a diagram 200 of an example of a baseline risk provisioning subsystem (e.g., subsystem 112 of FIG. 1). The diagram 200 includes an intrinsic risk datastore 202, a vulnerability datastore 204, a vulnerability-to-device correlation engine 206 coupled to the intrinsic risk datastore 202 and the vulnerability datastore 204, an indexed risk parameters datastore 208 coupled to the vulnerability-to-device correlation engine 206, and a baseline risk provisioning engine 210 coupled to the indexed risk parameters datastore 208.

In the example of FIG. 2, the intrinsic risk datastore 202 is intended to represent a data store of built-in risk. An example of a datastore of built-in risk is manufacturer disclosure statement for medical device security ($MDS^2$), medical device risk assessment platform (MDRAP), or other data associated with risk assessment provided by manufacturers. By way of example, $MDS^2$ is described in HIMSS/NEMA Standard HN 1-2013 entitled "Manufacturer Disclosure Statement for Medical Device Security," which is published by the National Electrical Manufacturers Association and is incorporated by reference herein. Intrinsic risk need not be limited to risk associated with medical devices and/or private data, though such risk receives a great deal of attention.

In the example of FIG. 2, the vulnerability datastore 204 is intended to represent a data store of identified vulnerability. An example of a datastore of identified vulnerabilities is the National Vulnerability Database (NVD), which is a Common Weakness Enumeration (CWE) system. By way of example, the NVD provides a list of Common Vulnerabilities and Exposures (CVEs) using the Common Vulnerability Scoring System (CVSS), which is based on a set of equations using metrics such as access complexity and availability of a remedy. The CWE is sustained by a community project with goals of understanding flaws in software and creating automated tools to identify, fix, and prevent those flaws; the project is sponsored by the National Cybersecurity FFRDC, which is operated by the MITRE Corporation, with support from US-CERT and the National Cybersecurity Division of the U.S. Department of Homeland Security. CWE has over 600 categories, including classes for buffer overflows, path/directory tree traversal errors, race conditions, cross-site scripting, hard-coded passwords, and insecure random numbers. There are 62 organizations as of December 2019 that develop and maintain products and services that achieved CWE Compatible status. By way of example, "Requirements and Recommendations for CWE Compatibility and CWE Effectiveness," version 1.0, by Martin et al. (Jul. 28, 2011) is incorporated by reference.

In the example of FIG. 2, the vulnerability-to-device correlation engine 206 is intended to represent an engine that queries the intrinsic risk datastore 202 and the vulnerability datastore 204 to correlate known risk with a device. In a specific implementation, the vulnerability-to-device correlation engine 206 queries the datastores 202, 204 directly. This is possible because the static risk is well-recognized. The vulnerability-to-device correlation engine 206 can assign indicators or identifiers (referred to as "indexes" when stored in the indexed risk parameters datastore 208), or use identifiers assigned prior to storage in the intrinsic risk datastore 202 or the vulnerability datastore 204, such as a URL, which are stored in the indexed risk parameters datastore 208.

In the example of FIG. 2, the baseline risk provisioning engine 210 is intended to represent an engine that uses the indexed risk parameters datastore 208 to provide a baseline risk assessment score to a progressive risk assessment system. In a specific implementation, the baseline risk assessment score is augmented by the progressive risk assessment system 108 (FIG. 1) to generate and update a progressive risk score over time. While it is possible to create a baseline risk assessment score using a weighted sum, it this specific implementation, the progressive risk assessment score is generated by correlating risk factors (of which baseline risk assessment score is one of multiple components) using an activity risk graph (e.g., sequence of events).

Figure 3:
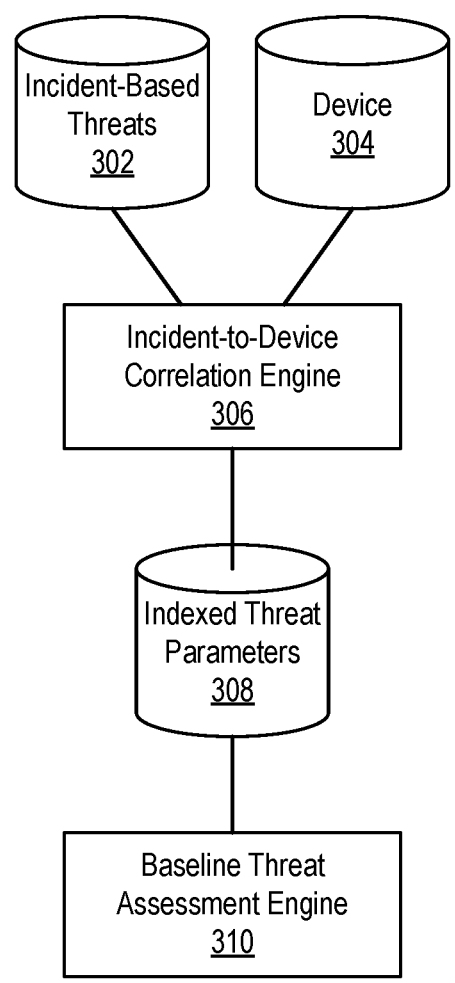
FIG. 3 depicts a diagram of an example of a threat vector assessment system.

FIG. 3 depicts a diagram 300 of an example of a threat vector assessment subsystem (e.g., subsystem 114 of FIG. 1). The diagram 300 includes an incident-based threats datastore 302, a device datastore 304, an incident-to-device correlation engine 306 coupled to the incident-based threats datastore 302 and the device datastore 304, an indexed threat parameters datastore 308 coupled to the incident-to-device correlation engine 306, and a baseline threat assessment engine 310 coupled to the indexed threat parameters datastore 308. Risk (see, e.g., FIG. 2) and threat can be distinguished in a number of ways, one of which is risk is associated with what is inside a device (hardware and/or software), while threat is associated with external devices (e.g., a reputation of a resource).

In the example of FIG. 3, the incident-based threats datastore 302 is intended to represent a data store of threat intelligence that is amassed over time, such as via input by the security community. The security community can identify issues or flows (e.g., by probing or passive observation) that were (presumably) accidentally included in software, and provide threat intelligence in an agreed-upon format, whether that format is standard or proprietary. Threat intelligence can take a format similar to that described with reference to FIG. 2 (e.g., a CWE format).

In the example of FIG. 3, the device datastore 304 is intended to represent a data store of threat intelligence that is amassed over time, such as via input by the security community. Threat intelligence can be obtained via passive monitoring or active probing and typically includes software and/or hardware (i.e., device) parameters, the latter of which is intended to be represented by the device datastore 304.

In the example of FIG. 3, the incident-to-device correlation engine 306 is intended to represent an engine that queries the incident-based threats datastore 302 and the device datastore 304 to correlate known incident-based threats with device vulnerabilities. In a specific implementation, the incident-to-device correlation engine 306 queries the datastores 302, 304 directly. This is possible because threat intelligence is generally publicly available. The incident-to-device correlation engine 306 can assign indicators or identifiers (referred to as "indexes" when stored in the indexed threat parameters datastore 308), or use identifiers assigned prior to storage in the datastores 302, 304, such as a URL, which are stored in the indexed threat parameters datastore 308.

In the example of FIG. 3, the baseline threat assessment engine 310 is intended to represent an engine that uses the indexed threat parameters datastore 308 to generate a baseline threat assessment score, which is provided to a progressive risk assessment system. In a specific implementation, the baseline threat assessment score is augmented by the progressive risk assessment system 108 (FIG. 1) to generate and update a progressive risk score over time. While it is possible to create a baseline risk assessment score using a weighted sum, in this specific implementation, the progressive risk assessment score is generated by correlating risk factors (of which baseline threat assessment score is one of multiple components) using an activity risk graph (e.g., sequence of events).

Figure 4:
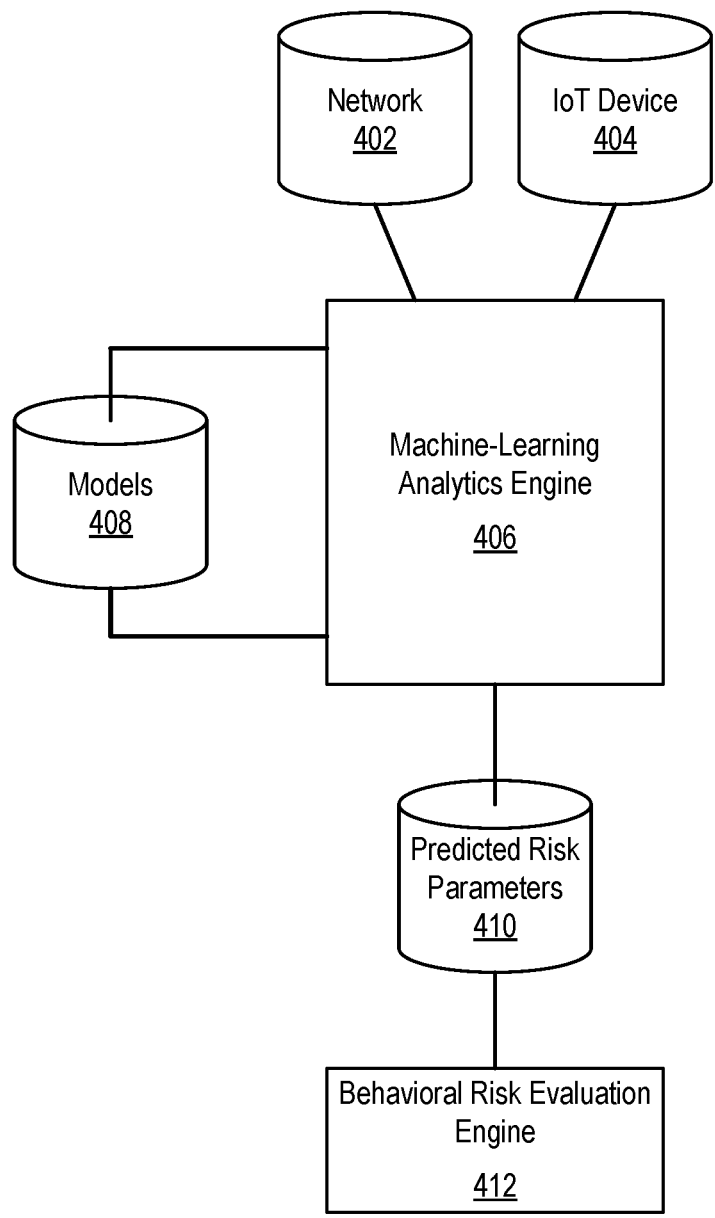
FIG. 4 depicts a diagram of an example of a behavioral risk evaluation system.

FIG. 4 depicts a diagram 400 of an example of a behavioral risk evaluation system (e.g., subsystem 116 of FIG. 1). The diagram 400 includes a network datastore 402, an IoT device datastore 404, a machine learning analytics engine 406 coupled to the network datastore 402 and the IoT device datastore 404, a models datastore 408 coupled to the machine learning analytics engine 406, a predicted risk parameters datastore 410 coupled to the machine learning analytics engine 406, and a behavioral risk evaluation engine 412 coupled to the predicted risk parameters datastore 410.

In the example of FIG. 4, the network datastore 402 is intended to represent data identifiable on a data pipeline. Depending upon implementation-specific, configuration-specific, or other factors, data packets may or may not be stored in non-volatile storage. Specifically, event metadata can be captured from data packets transmitted to and from an IoT device, without locally storing the actual data packets, if that is desirable. In a specific implementation, the network datastore 402 includes events based on messages transmitted by (or to) an IoT device. For example, one or a plurality of data packets transmitted by (or to) an IoT device can be characterized as events that can subsequently be used to determine whether the IoT device is behaving appropriately for the IoT device's given context. As another example, one or a plurality of data packets transmitted by (or to) an IoT device can be correlated to an event of a specific application being executed on the IoT device. Events can be associated with a specific context of an IoT device, such as having a specific operating system executing on an IoT device or being controlled by a specific user. In a specific implementation, events are determined locally (e.g., at a device within a LAN associated with or formed in part through an IoT device) with respect to IoT devices. For example, a local agent can determine events for use in detecting undesired behavior in IoT device operation relative to the IoT device's historical operation, relative to other similarly classified IoT devices' operations, relative to similarly profiled IoT devices' operations, etc.

In a specific implementation, the network datastore 402 includes event parameters (data or metadata) obtained by analyzing data packets, such as via packet header analysis or deep packet inspection (DPI). For example, if a data packet can be correlated with a specific application, then the network datastore 402 can include an event parameter of the specific application executed in association with an IoT device. As another example, if DPI is used, payload of a data packet sent from an IoT device can be analyzed to identify an event parameter from the data packet.

In a specific implementation, the network datastore 402 includes one or a combination of device sensor events, session events, application events, user events, protocol events, and status events included as part of a context of an IoT device in operation. Device sensor events can include events that occur at the physical layer of the physical layer or data link layer of the open system interconnection (hereinafter referred to as "OSI") model. For example, device sensor events can include a virtual LAN (hereinafter referred to as "VLAN") used by an IoT device to communicate with a specific data source. Session events can include events that occur at either the network layer or the transport layer of the OSI model. For example, session events can include a specific network type used by an IoT device to communicate with a source. Application events include events that occur at one or a combination of the session layer, the presentation layer, and the application layer of the OSI model. For example, application events can include an identification of an application executed at an IoT device in accessing network services. Device events can include events that occur at a specific device. User events can include events that occur in associated with a specific user interacting with an IoT device. For example, user events can include specific instances in which a specific user interacts with IoT devices. Status events can include events associated with whether an IoT device is operating. For example, status events can include an event indicating whether an IoT device is operating within a given operational efficiency range.

In the example of FIG. 4, the IoT device datastore 404 is intended to represent a data store of parameters associated with IoT devices on an enterprise network.

In the example of FIG. 4, the machine learning analytics engine 406 is intended to represent an engine that builds behavioral models for IoT devices. In a specific implementation, the machine learning analytics engine 406 functions to determine analytics features of IoT devices in operation using the network datastore 402 and the IoT device datastore 404. An analytics feature is a transformation of one or more timestamped events, including composite events. As used in this paper, a composite event comprises multiple event parameters, but is referred to as an "event," which is a more general term intended to represent a discrete event or a combination of event parameters (which can include one or more discrete events). For example, a discrete event, such as a signal transmitted from a thermometer associated with a discrete temperature sensing instance, can be combined with an event parameters for the destination of the signal, historical signal transmissions, transmissions of similarly classified IoT devices, and the like, to generate a composite event. The machine learning analytics engine 406 can determine analytics features of IoT devices in operation based on messages transmitted to or from IoT devices. For example, the machine learning analytics engine 406 can examine messages transmitted to an IoT device to determine an event which can subsequently be timestamped to create an analytics feature of the IoT device in operation. The machine learning analytics engine 406 can generate analytics features of IoT devices in operation within a time window. For example, the machine learning analytics engine 406 can examine all messages transmitted from an IoT device within a one hour period to determine a feature of the IoT device in operation. A time window, also referred to as a data rollup window, can be used by the machine learning analytics engine 406 to generate features of an IoT device in operation. For example, the machine learning analytics engine 406 can examine packets transmitted from a first IoT device over a 24 hour period and examine packets transmitted from a second IoT device over a five minute period to extract features of the first and second IoT devices in operation. A time window used by the machine learning analytics engine 406 to extract features of IoT devices in operation can vary based on contexts of the IoT devices. For example, the machine learning analytics engine 406 can vary time windows used to extract features of IoT devices in operation based on device types of the IoT devices.

In a specific implementation, the machine learning analytics engine 406 functions to aggregate determined events for purposes of determining undesired behavior in IoT device operation. The machine learning analytics engine 406 can aggregate events based on context, such as by way of a profile-based aggregation. For example, the machine learning analytics engine 406 can aggregate events based on recipients of data packets transmitted from an IoT device. In another example, the machine learning analytics engine 406 can aggregate events based on an IoT device ID or a port used transmit data packets from which the events are translated. Further, the machine learning analytics engine 406 can aggregate events based on contexts associated with events. For example, the machine learning analytics engine 406 can aggregate events based on whether the events are one or a combination of device sensor events, session events, application events, user events, protocol events, and status events.

In a specific implementation, the machine learning analytics engine 406 can aggregate events of IoT devices in operation using common factor aggregation machine learning. Common factor aggregation creates various aggregations and transformations from the incoming data events leveraging on supervised classification, unsupervised clustering-based machine learning, and multi-layer deep learning to model various behavior patterns of IoT devices so the IoT devices can be grouped/labelled based on their behaviors. For example, an ultrasound machine running windows OS and connecting to its home servers in Europe would be tagged with, in this example, 2 different behavior aggregation factors and the correlation of these behaviors can help accurately identify the device as an ultrasound machine of a specific model.

In a specific implementation, the machine learning analytics engine 406 can aggregate events of IoT devices in operation using common factor aggregation machine learning. For example, if, through machine learning, common factors of an IoT device being hacked are identified, then the machine learning analytics engine 406 can group events of IoT devices being hacked based on the common factors identified through machine learning. Alternatively or in addition, the machine learning analytics engine 406 can use common factor aggregation machine learning to identify common factors of contexts of IoT devices in operation, for use in aggregating events based on context. For example, if events related to operation of IoT devices by a particular user share a specific common factor, identified through machine learning, then the machine learning analytics engine 406 can group events of the user operating IoT devices together based on the specific common factor.

To allow comparison of events for common factor aggregation, a harmonized framework of events (e.g., a common methodological framework) is desirable, which can be implemented as a huge amount of data that is analyzed for commonalities. The analysis takes more or less work depending upon the type of data (e.g., comparing sources and destinations is relatively straight-forward, while comparing values identified using deep packet inspection of payload is relatively less straight-forward). Reducing factors to a common baseline is impractical due to the number of different aggregations that are relevant in an IoT network comprising a large number of devices; reduction to a common baseline is useless for predictive purposes. Multiple aggregations are necessary and may not even be easily identifiable to a human because the common factors are not easily categorized by the human mind and, due to their numbers, will, in practice, likely go without human-understandable aggregations of common factors. Indeed, it is a hopeless task for a human given the number and frequency of communications IoT networks are already generating, even if all of the aggregations were uniquely describable to a human. So a computer must be used to find the large number of common factors necessary to yield predictable, and therefore actionable, intelligence; humans can, of course, help in categorization or other tasks after being augmented by the computer.

In a specific implementation, the machine learning analytics engine 406 functions to drop specific determined features or events from consideration in determining whether an IoT device is operating in an undesirable manner. In dropping specific features from consideration in determining whether an IoT device behavior is undesirable, the machine learning analytics engine 406 can filter out irrelevant factors to only keep IoT compatible features for purposes of determining whether the IoT device behavior is undesirable. For example, the machine learning analytics engine 406 can filter out features associated with human factors in IoT device operation for purposes of determining whether the IoT device behavior is undesirable.

In a specific implementation, the machine learning analytics engine 406 functions to filter out features for use in detecting undesired device behavior based on either or both a personality of an IoT device and a profile of a group of IoT devices including the IoT device. A personality of an IoT device includes applicable data describing operation of an IoT device for purposes of detecting undesired behavior of the IoT device in operation. For example, a personality of an IoT device can include normal operating behavior patterns of an IoT device and undesired operating behavior patterns of an IoT device. A profile of a group of IoT devices includes application data describing operation of IoT devices in the group for purposes of detecting undesired behavior of the IoT devices in operation. For example, a profile of a group of IoT devices can include normal operating behavior patterns of IoT devices in the group and undesired operating behavior patterns of the IoT devices in the group. IoT devices can be grouped together to form a profile, based on one or a combination of characteristics of the IoT devices, operational characteristics of the IoT devices, and contexts of the IoT devices in operation. For example, all thermostat IoT devices of a specific manufacturer can be grouped together to form a profile. In filtering out features for use in detecting undesired device behavior based on either or both a personality of an IoT device and a profile of a group of IoT devices, the machine learning analytics engine 406 can filter out normal operating behaviors of the IoT device of the group of IoT devices using the personality of profile.

In a specific implementation, the machine learning analytics engine 406 functions to add aggregated events and features into an event buffer. An event buffer includes a collection of events and features that are held for a period of time and analyzed to determine whether an IoT device is exhibiting undesired behavior in operation. An event buffer can be specific to a context associated with an IoT device in operation. For example, an event buffer can be associated with or specific to an application and can be used to determine whether an IoT device is exhibiting undesired behavior in operation when the application is executing at the IoT device. In another example, an event buffer can be associated with IoT devices of a specific device type and can be used to determine whether an IoT device of the device type is exhibiting undesired behavior in operation. The machine learning analytics engine 406 can buffer aggregated events and features into event buffers based on contexts associated with aggregated events and features, e.g. contexts of an IoT device in operation. For example, the machine learning analytics engine 406 can buffer aggregated events and features into an event buffer based on whether the events are one or a combination of device sensor events, session events, application events, user events, protocol events, and status events.

In a specific implementation, the machine learning analytics engine 406 trains models, represented by the models datastore 408, which are subsequently used to determine undesired behavior in IoT device operation through application of a context-based undesired behavior detection model to events and features of an IoT device. A context-based undesired behavior detection model includes applicable data describing either or both normal and abnormal behavior patterns or portions of behavior patterns of one or a plurality of IoT devices in operation. Specifically, a context-based undesired behavior detection model can include a modeled set of features indicating all or a portion of a behavior pattern. For example, a context-based undesired behavior detection model can include a combination of behavior events each indicated by a single modeled feature to form a behavior pattern. A context-based undesired behavior detection model is specific to a context of an IoT device. For example, a context-based undesired behavior detection model can indicate normal behavior patterns of an IoT device in interacting with a specific remote system. In applying a context-based undesired behavior detection model to determine undesired behavior in IoT device operation, the machine learning analytics engine 406 can apply the model to compare current or past operating of an IoT device, e.g. indicated by aggregated events and features, with normal or abnormal behavior patterns indicated by the model. Subsequently, by comparing the current or past operating of the IoT device with normal or abnormal behavior patterns, undesired behavior in IoT device operation can be detected.

In a specific implementation, a context-based undesired behavior detection model is included as part of a personality of an IoT device or a profile of a group of IoT devices. For example, a context-based undesired behavior detection model can include normal behavior patterns of IoT devices manufactured by the same manufacturer. In another example, a context-based undesired behavior detection model can include normal behavior patterns of a specific IoT device when a streaming music application is executed on the IoT device.

In a specific implementation, the machine learning analytics engine 406 performs personality classification for IoT devices through application of a plurality of context-based undesired behavior detection models to events and features of IoT device operation. A behavior pattern of an IoT device can be represented by a plurality of context-based undesired behavior detection models. Accordingly, the machine learning analytics engine 406 can apply the plurality of context-based undesired behavior detection models to aggregated events and features of an IoT device in operation to determine IoT device personality. For example, if a first context-based undesired behavior detection model indicates a first aspect of a behavior pattern of an IoT device and a second context-based undesired behavior detection model indicates a second aspect of the behavior pattern of the IoT device, then the machine learning analytics engine 406 can apply both the first and second models to classify the IoT device as having a bad personality.

In a specific implementation, the machine learning analytics engine 406 functions to apply a context-based undesired behavior detection model to aggregated events and features of an IoT device collected in event buffers in IoT device personality classification. Advantageously, aggregation based on remote, per application, per IP, or other factors can be on a granular level. For example, the machine learning analytics engine 406 can apply a context-based undesired behavior detection model to aggregated events and features in a buffer, in an order of the events and features in the buffer. The machine learning analytics engine 406 can apply specific context-based undesired behavior detection models to events and features based on a specific event buffer in which the events and features are collected. For example, if aggregated events are in an event buffer associated with applications executing on an IoT device, then the machine learning analytics engine 406 can apply context-based undesired behavior detection models for IoT device personality classification when applications are executed at the IoT device. In another example, if aggregated events are in an event buffer associated with session events, then the machine learning analytics engine 406 can apply context-based undesired behavior detection models for IoT device personality classification at a network layer level.

In a specific implementation, the machine learning analytics engine 406 functions to apply a context-based undesired behavior detection model to aggregated events and features based on a context of an IoT device in operating to generate the events. For example, the machine learning analytics engine 406 can apply a context-based undesired behavior detection model to aggregated events based on a port used in communicating data packets used to determine the events. In applying a context-based undesired behavior detection model to aggregated events based on a context of an IoT device, the machine learning analytics engine 406 can apply a context-based undesired behavior detection model based on an undesired behavior detection model in which the events are buffered. For example, the machine learning analytics engine 406 can apply a context-based undesired behavior detection model for analyzing device events to events buffered into an event buffer associated with detecting undesired behavior in events that occur at a specific device layer.

In a specific implementation, the machine learning analytics engine 406 functions to maintain context-based undesired behavior detection models for use in detecting undesired behavior in IoT device operation. In maintaining a context-based undesired behavior detection model for use in detecting undesired behavior in IoT device operation, the machine learning analytics engine 406 can create and update a context-based undesired behavior detection model. For example, the machine learning analytics engine 406 can update a context-based undesired behavior detection model as an IoT device continues to operate. The machine learning analytics engine 406 can maintain a context-based undesired behavior detection model based on operation of an IoT device within a specific data window. For example, the machine learning analytics engine 406 can adjust a context-based undesired behavior detection model offline daily based on IoT device operation during the day.

In a specific implementation, the machine learning analytics engine 406 functions to maintain a context-based undesired behavior detection model based on events determined based on operation of one or a plurality of IoT devices. For example, the machine learning analytics engine 406 can maintain a context-based undesired behavior detection model based on feature values of events occurring during operation of an IoT device. Additionally, the machine learning analytics engine 406 can maintain a context-based undesired behavior detection model based on aggregated events occurring during operation of one or a plurality of IoT devices. For example, the machine learning analytics engine 406 can update a context-based undesired behavior detection model based on feature values of events during operation of one or a plurality of IoT devices. Further in the example, the machine learning analytics engine 406 can maintain the context-based undesired behavior detection model based on the feature values of the events aggregated together using common factor aggregation based on contexts of the one or a plurality of the IoT devices in operation.

In a specific implementation, the machine learning analytics engine 406 functions to determine behavior patterns of an IoT device in operation for use in maintaining a context-based undesired behavior detection model. The machine learning analytics engine 406 can determine behavior patterns of an IoT device in operation based on aggregated events of the IoT device in operation. For example, if an IoT device exchanges data with a source every night, as indicated by aggregated events of the IoT device in operation, then the machine learning analytics engine 406 can determine a behavior pattern of the IoT device is exchanges data with the source at night. The machine learning analytics engine 406 can use an applicable machine learning mechanism to determine a behavior pattern of an IoT device in operation.

In a specific implementation, the machine learning analytics engine 406 functions to maintain a context-based undesired behavior detection model based on contexts of one or a plurality of IoT devices in operation. Specifically, the machine learning analytics engine 406 can maintain a context-based undesired behavior detection model based on a context of an IoT device in operating to generate aggregated events used to maintain the model. For example, if aggregated events of the IoT device in operation a created when a specific application is executing, then the machine learning analytics engine 406 can associate a context-based undesired behavior detection model generated using the events with the specific application. Further in the example, the context-based undesired behavior detection model can be applied by the machine learning analytics engine 406 to aggregated events generated when the specific application is executing at the IoT device to determine undesired behavior in the operation of the IoT device.

In a specific implementation, the machine learning analytics engine 406 functions to maintain a context-based undesired behavior detection model as part of either or both a personality of an IoT device and a profile group of IoT devices. For example, the machine learning analytics engine 406 can maintain a context-based undesired behavior detection model based on operation of an IoT device and subsequently include the context-based undesired behavior detection model as part of a personality of the IoT device. In maintaining a context-based undesired behavior detection model as part of a profile group of IoT devices, the machine learning analytics engine 406 can group together the IoT devices based on context of the IoT devices in operation. For example, the machine learning analytics engine 406 can group together IoT devices of a specific type, e.g. a context, into a profile group and subsequently add context-based undesired behavior detection models generated based on operation of the IoT devices into the profile group of the IoT devices.

In an example of operation of the example system shown in FIG. 4, the machine learning analytics engine 406 identifies events of IoT devices represented as the IoT device datastore 404 from a communication medium or datastore represented as the network datastore 402, uses machine learning to train behavioral models represented as the models datastore 408, and outputs event-related risk parameters associated with IoT device behavior to the predicted risk parameters datastore 410. In the example of operation of the example system shown in FIG. 4, the machine learning analytics engine 406 determines behaviors of an IoT device using, for example, aggregated events in an event buffer. Instead or in addition, the machine learning analytics engine 406 applies a context-based undesired behavior detection model to IoT device behavior using the event buffer to determine undesired behavior of the IoT device in operation.

In the example of FIG. 4, the behavioral risk evaluation engine 412 is intended to illustrate an engine that qualitatively evaluates predicted risk parameters associated with IoT device behavior to provide a behavioral risk score. In a specific implementation, behavioral risks include anomalies, thresholds (need to train a model to determine range of risk), classified behaviors (some activities are more risk than others, as are a set of activities in a given order), and binary attributes (e.g., using an Internet browser or email). As used in this paper, behavioral risk has not yet caused harm, but can be evaluated in combination with a variety of factors to have an associated eventual risk (e.g., having a large number of open ports is not harm per se, but could be indicative of future risk). Thus "bad behavior" may be indicative of a device acting in a manner that is contrary to policy, but it is not necessarily indicative of current harm.

Figure 5:
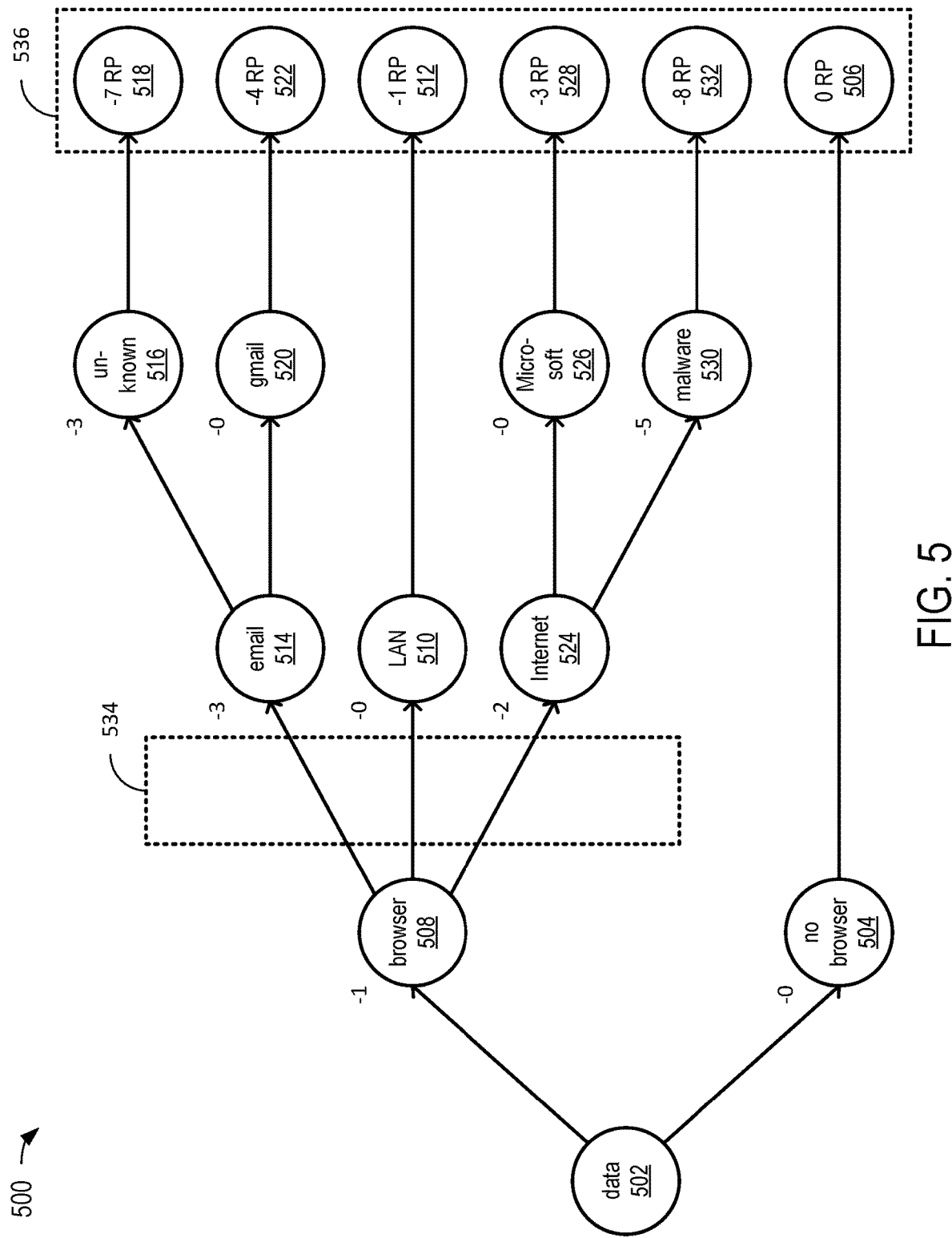
FIG. 5 depicts an example of an activity graph.

FIG. 5 depicts an example of an activity graph 500. The activity graph 500 has been simplified for illustrative purposes. The activity graph 500 includes a data root node 502, which is intended to represent events associated with an activity, which will be assumed for illustrative purposes to be the activity of providing images from an X-ray machine. (As used in this paper, higher reward points are associated with lower risk).

If the events at the data root node 502 indicate the X-ray machine is not sending the images via a browser, the activity graph 500 follows the path to "no browser" node 504. In the example of FIG. 5, the negative number to the upper left of the "no browser" node 504 (and other non-root and non-leaf nodes of the activity graph 500) indicates reward points for progressing to the "no browser" node 504 (or other non-root and non-leaf nodes of the activity graph 500), which is 0 for the "no browser" node 504. In the activity graph 500, there is only one path from the "no browser" node 504 and that path is to the 0 RP leaf node 506. The 0 RP leaf node 506 (and other leaf nodes of the activity graph 500) illustrates the sum of reward points for the path, which in this case is 0 for passing through the "no browser" node 504 and no other nodes between the data root node 502 and the 0 RP leaf node 506.

The other paths of the activity graph 500 pass first through the browser node 508, which has −1 associated reward points. A first of the three paths from the browser node 508 is through the LAN node 510, which has no associated reward points, and to the −1 RP leaf node 512. A second of the three paths from the browser node 508 is through the email node 514, which has −3 associated reward points, the unknown [email application] node 516, which has −3 associated reward points, and to the −7 RP leaf node 518; or from the browser node 508 through the email node 514, which has −3 associated reward points, the gmail node 520, which has no associated reward points, and to the −4 RP leaf node 522. A third of the three paths from the browser node 508 is through the Internet node 524, which has −2 associated reward points, the Microsoft node 526, which has no associated reward points, and to the −3 RP leaf node 528; or from the browser node 508 through the Internet node 524, which has −2 associated reward points, the malware node 530, which has −5 associated reward points, and to the −8 RP leaf node 532.

Although the activity graph 500 is intentionally simplified for illustrative purposes, it is worth pointing out that CVE scores can be inserted into the graph as additional nodes as identified by the dotted box 534. The set of CVE scores can include reward points that vary depending upon the specific CVE and one of the CVE node reward points could be 0 for when, e.g., browser version doesn't matter given the events associated with the activity (or, equivalently, the activity graph 500 could omit the nodes if they do not change the reward points). It may further be noted the root node 502 can be considered a null node and the leaf nodes 536 need not be represented as nodes (because they are simply reward point sums in this example).

In a specific implementation, baseline risk graphs and threat vector graphs can be created in a manner similar to that described with reference to the example of FIG. 5, as can behavior graphs, which can then be combined with other graphs using weighted sums. It is also possible to combine such graphs with non-activities, such as an identification non-activity (or identification event) for which id, type, vendor, or model can be used to provide reward points.

Alerts can be used to train a model to determine reward points. Different activities can be ranked and a triggered alert can be mapped back to an activity and sequence of events. Through training, it is possible to determine how to assign reward points at each event of an activity and rank events and assign reward points based on the ranking.

Figure 6:
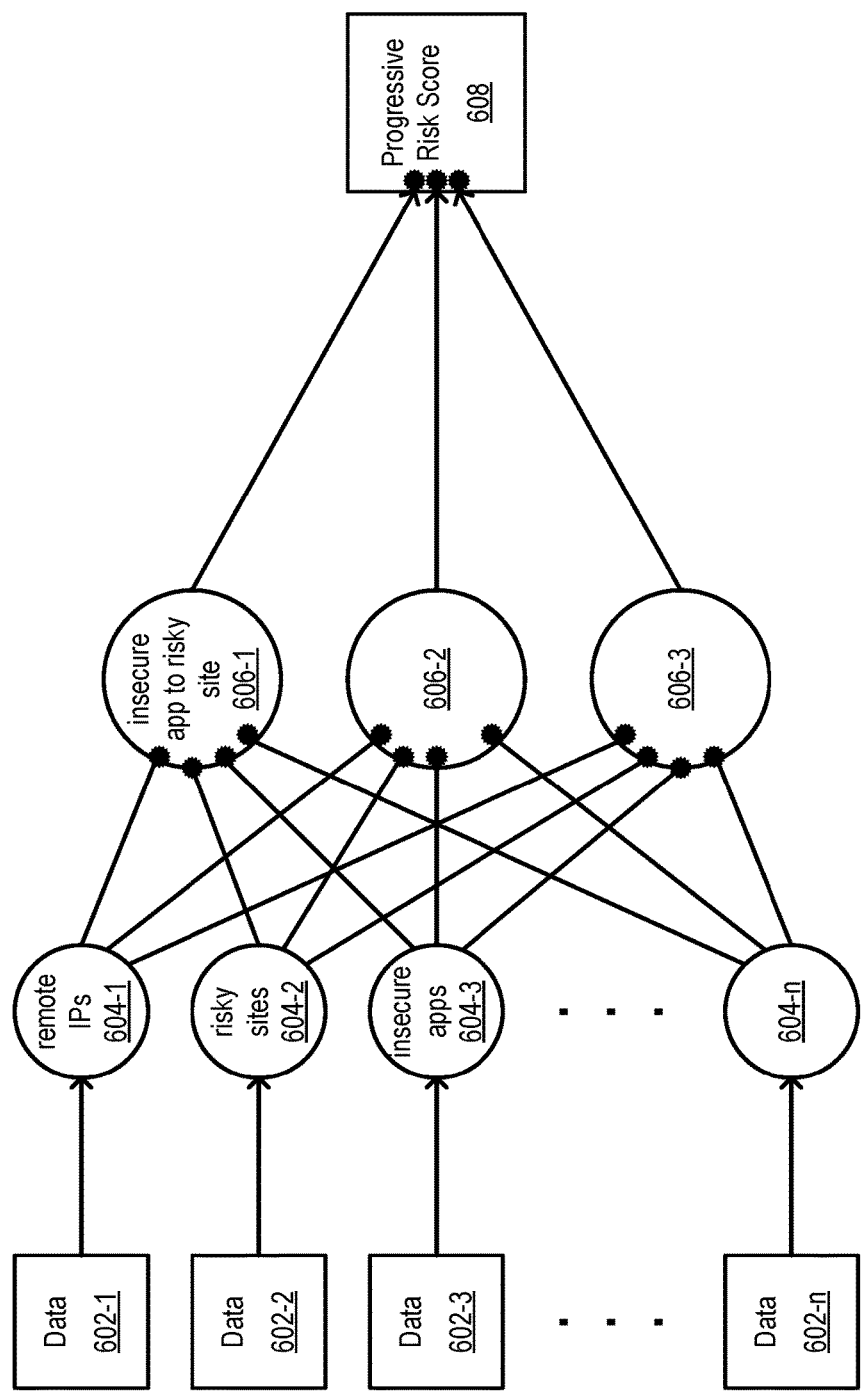
FIG. 6 depicts a progressive risk prediction graph.

FIG. 6 depicts a progressive risk prediction graph 600. The progressive risk prediction graph 600 illustrates how activity graphs (specifically, those activity graphs associated with baseline risk and threat vectors) can be meaningfully combined with IoT device behavior to provide risk scores in a human-understandable format. The progressive risk prediction graph 600 includes data 602-1 to data 602-n (collectively the data 602), respectively associated with input layer features 604-1 to input layer features 604-n (collectively the input layer features 604). For illustrative purposes, the input layer feature 604-1 is "remote IPs," the input layer feature 604-2 is "risky sites," and the input layer feature 604-3 is "insecure apps," but the specific designation is not critical to understanding. Depending upon implementation-specific, configuration-specific, or other factors, the input layer features can include publicly recognized vulnerabilities (e.g., CVEs), power off in operational state, malfunction causes health risk, type of device, Wi-Fi, encrypted Wi-Fi, Bluetooth, public DNS, or the like.

In the progressive risk prediction graph 600, permutations of the input layer features 604 are connected to hidden layer identity relationship node 606-1 to hidden layer identity relationship node 606-3 (collectively the hidden layer identity relationship nodes 606). The incoming connections to the hidden layer identity relationship nodes 606 can be characterized as part of a baseline risk layer and a threat vector layer. For example, the 16-point stars (subnodes) illustrated in the example of FIG. 6 can be associated with observations of malware activity in a URL, flagged malicious email address, how many CVEs on this type of device, type of file recognized as having malware payload, or the like. In general, the density of the subnodes is correlated with higher risk. Although there are three hidden layer identity relationship nodes 606 in the progressive risk prediction graph 600, the number can be different and/or dynamic. Behavior is taken into account at the hidden layer identity relationship nodes 606, where a correlation of risk factors is considered.

In the progressive risk prediction graph 600, the hidden layer identity relationship nodes 606 are connected to an output layer 608, which has an associated progressive risk score. As such, the progressive risk prediction graph 600 can be used in a reinforcement learning-based IoT risk evaluation system.

Figure 7:
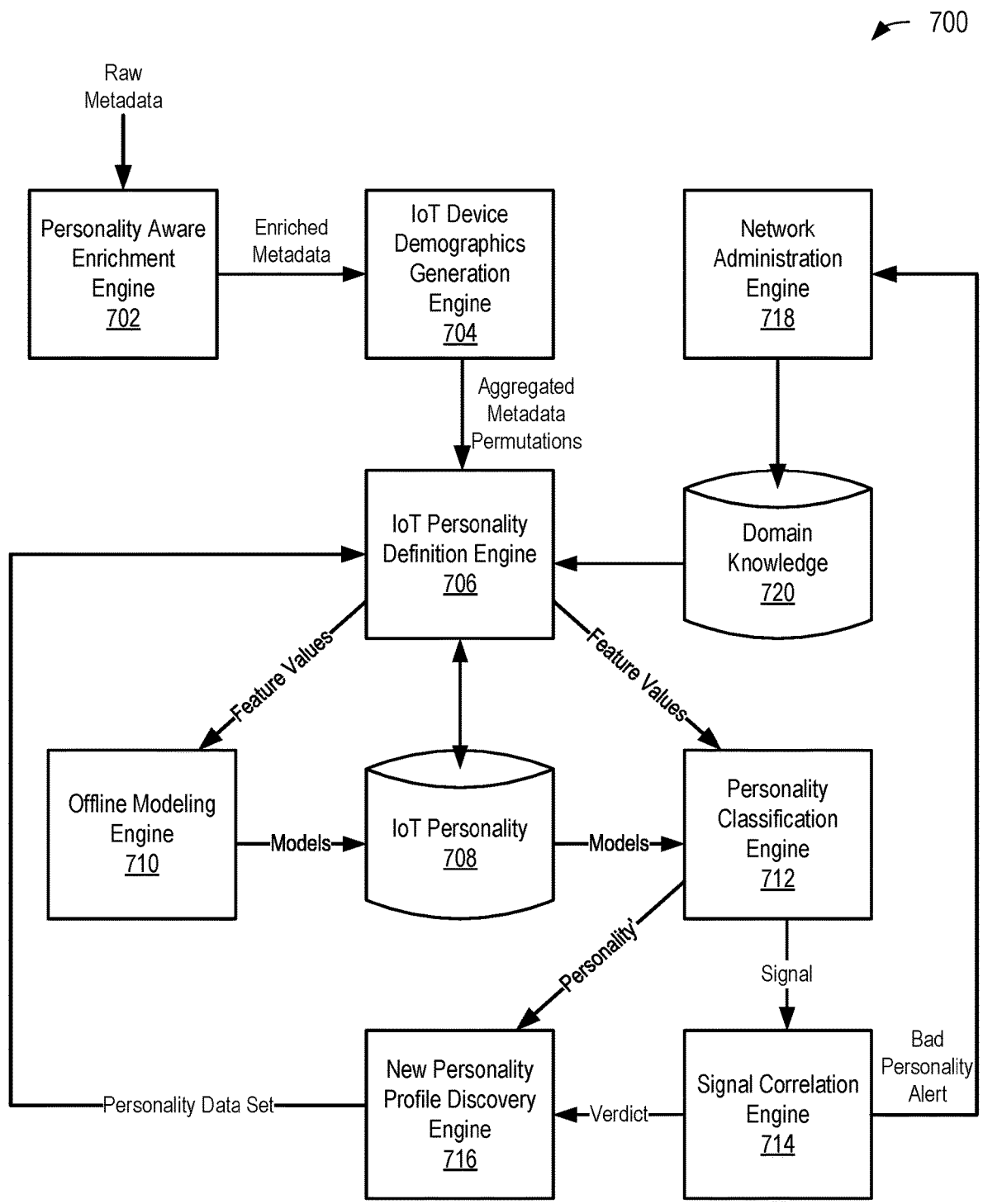
FIG. 7 depicts a diagram of an example of a IoT device personality management system.

FIG. 7 illustrates the interplay between machine learning behavior and the detection of undesired behavior (and afterward revisiting how to generate a progressive risk score). FIG. 7 depicts a diagram 700 of an example of an IoT device personality management system. IoT devices can be characterized as having a personality. A personality can be bad, which means the personality is identifiable as one that belongs to a device that exhibits or has an unacceptable risk to exhibit undesirable behavior. A personality can be good, which means the personality is identifiable as one that belongs to a device that has not and is not expected to exhibit undesirable behavior. Devices can exhibit anomalous behavior, but anomaly detection is a useful tool to determine whether a device is exhibiting undesirable behavior, so anomalous behavior is sometimes associated with undesirable behavior. Over time, anomalous behavior can be indicative of an as-of-yet-unidentified personality. That is, if a device with a first personality exhibits anomalous behavior, it may be possible to define a second personality similar in some ways to the first personality, but for which certain behavior is not anomalous. Similarly, a first personality could be better defined over time to include what was previously anomalous behavior as non-anomalous behavior. Accordingly, it may be desirable to provide a system that can not only classify IoT devices as having various personalities, but also to provide a system that can allow personality to have malleable definitions and that can define new personalities over time.

The example system shown in FIG. 7 can be included as part of an applicable system for detecting undesired behavior in operation of an IoT device and generating a progressive risk score. Applicable portions of the system shown in FIG. 7 can be implemented locally with respect to an IoT device, e.g. at a device within a LAN of the IoT device. Additionally, applicable portions of the system shown in FIG. 7 can be implemented remote from an IoT device, e.g. in a cloud.

The example system shown in FIG. 7 includes a personality aware enrichment engine 702, an IoT device demographics generation engine 704, an IoT personality definition engine 706, an IoT personality datastore 708, an offline modeling engine 710, a personality classification engine 712, a signal correlation engine 714, a new personality profile discovery engine 716, a network administration engine 718, and a domain knowledge datastore 720. In the context of FIG. 7, personality awareness is more specific than context awareness in the sense that personality implicates an understanding of institutional protocols. An IoT device that "has a personality" indicates the IoT device most closely matches a known personality and at least one of the combination of features that define the personality is associated with an institutional protocol. It should be noted that, for practical purposes, it may be desirable to throw away irrelevant or unstable features to match an IoT device to a personality.

When a personality is matched, an IoT device can be characterized as exhibiting behavior consistent with the matched personality. While FIG. 7 indicates a personality can be "bad," a more nuanced characterization of a personality, or at least of behavior exhibited by an IoT with the personality, would be that behavior can have levels of risk. The amount of risk can be characterized as a behavior risk score, as determined by a behavioral risk evaluation engine, such as the behavioral risk evaluation engine 412 (FIG. 4). Advantageously, the behavioral risk score can be combined with a baseline risk layer and a threat vector layer, as described previously, to obtain a progressive risk score with heretofore undiscovered predictive value, particularly in an IoT network setting.

The personality aware enrichment engine 702 is intended to represent an engine that functions to enrich raw event metadata received based on operation of an IoT device. The personality aware enrichment engine 702 can receive raw metadata in the form of data packets or portions of data packets transmitted to and from an IoT device in operation of the IoT device. In enriching raw event metadata, the personality aware enrichment engine 702 can identify an IoT device and assign a context to the IoT device.

The IoT device demographics generation engine 704 is intended to represent an engine that receives enriched metadata to maintain demographics of IoT devices including the IoT device. The IoT device demographics generation engine 704 receives the enriched metadata from the personality aware enrichment engine 702. In maintaining demographics of IoT devices based on enriched metadata, the IoT device demographics generation engine 704 can establish profiles of groups of IoT devices. For example, the IoT device demographics generation engine 704 can group together IoT devices that share a common context together to form a profile of a group of the IoT devices. Additionally, in maintaining demographics of IoT devices, the IoT device demographics generation engine 704 can aggregate and create permutations of the enriched metadata to generate aggregated metadata permutations. For example, the IoT device demographics generation engine 704 can group together all enriched metadata related to streaming events at the IoT device together to generate aggregated metadata permutations.

The IoT personality definition engine 706 is intended to represent an engine that functions to define a personality of the IoT device. The IoT personality definition engine 706 can define a personality of the IoT device by generating and updating IoT personality data stored in the IoT personality datastore 708. Additionally, the IoT personality definition engine 706 can define a personality of the IoT device using aggregated metadata permutations received from the IoT device demographics generation engine 704. More specifically, the IoT personality definition engine 706 can identify feature values indicating behaviors of the IoT device in operation based on aggregated metadata permutations received from the IoT device demographics generation engine 704.

The offline modeling engine 710 is intended to represent an engine that functions to build a context-based undesired behavior detection model for use in detecting undesired behavior in the operation of the IoT device. The offline modeling engine 710 can build a context-based undesired behavior detection model based on feature values indicating behaviors of the IoT device in operation, as determined by the IoT personality definition engine 706. Additionally, the offline modeling engine 710 can use an applicable machine learning mechanism to recognize behavior patterns in the feature values to build the context-based undesired behavior detection model. For example, the offline modeling engine 710 can use either or both learned state transition-based learning and deep learning to identify behavior patterns of the IoT in operation for purposes of maintaining a context-based undesired behavior detection model.

The personality aware undesired behavior detection engine 712 is intended to represent an engine that functions to apply a context-based undesired behavior detection model to feature values for purposes of detecting undesired behavior in the operation of the IoT device. The personality aware undesired behavior detection engine 712 can apply a context-based undesired behavior detection model maintained by the offline modeling engine 710 to feature values of the IoT device identified by the IoT personality definition engine 706. In applying the model to feature values, the personality aware undesired behavior detection engine 712 generate a signal comparing actual behaviors of the IoT device in operation to modeled behaviors of the IoT device.

The signal correlation engine 714 is intended to represent an engine that functions to generate and send undesirable behavior alerts. The signal correlation engine 714 can generate and send undesirable behavior alerts based on actual behaviors of the IoT device in operation to modeled behaviors of the IoT device, as received from the personality aware undesired behavior detection engine 712. The signal correlation engine 714 can send an undesirable behavior alert indicating how the IoT device deviated from normal behavior patterns, e.g. benign behavior patterns, in exhibiting undesired behavior in operation.

The new personality profile discovery engine 716 is intended to represent an engine that functions to identify a personality profile of the IoT device. The new personality profile discovery engine 716 can detect whether an IoT personality profile exists for the IoT device based on one or a combination of raw metadata received at the personality aware enrichment engine 702, enriched raw metadata received at the IoT device demographics generation engine 704, aggregated metadata permutation received at the IoT personality definition engine 706, and feature values determined by the IoT personality definition engine 706. The new personality profile discovery engine 716 can inform the IoT personality definition engine 706 whether an IoT personality profile exists for the IoT device for purposes of defining the IoT personality for the IoT device.

Figure 8:
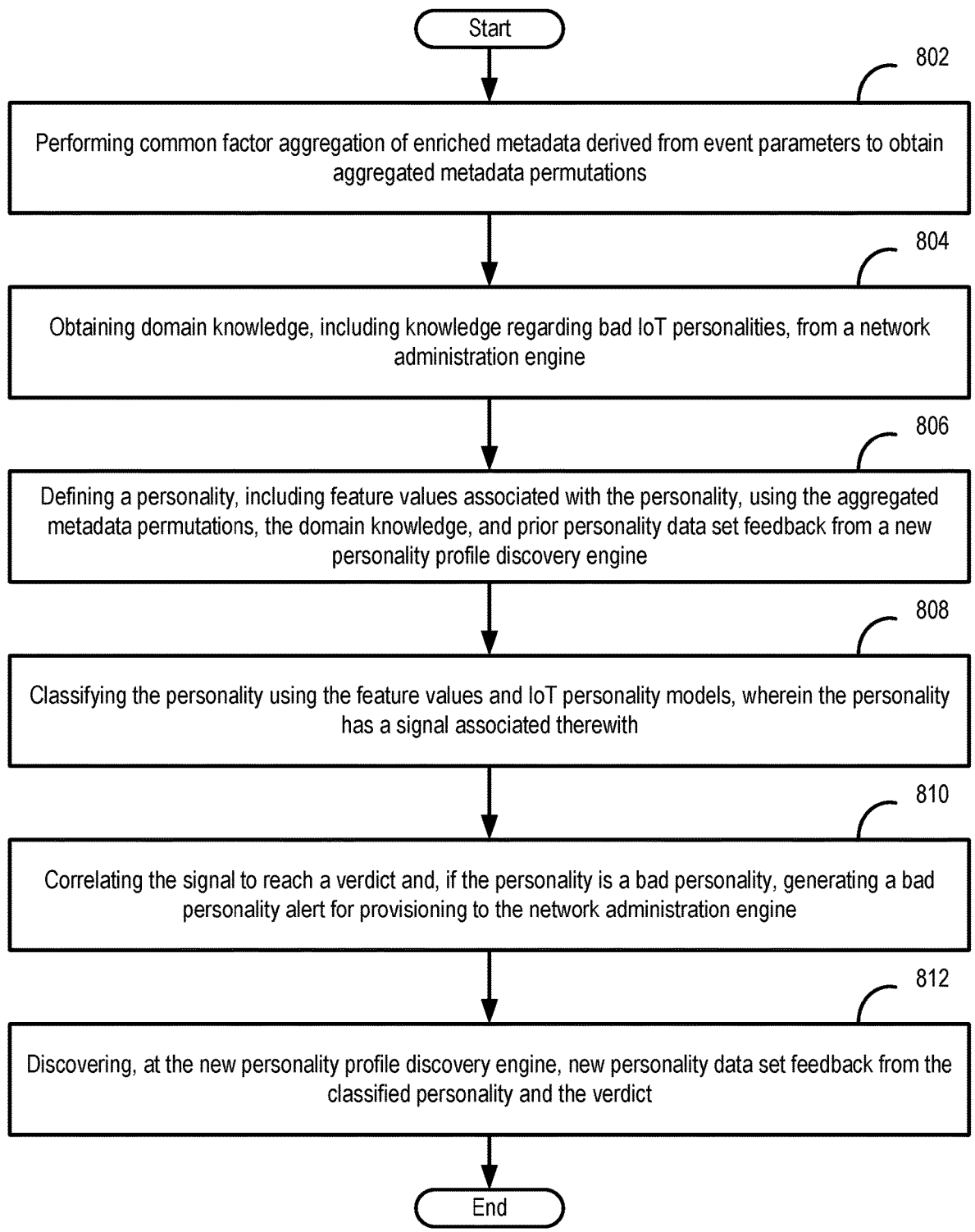
FIG. 8 depicts a flowchart of an example of a method of IoT device personality management.

FIG. 8 depicts a flowchart 800 of an example of a method of IoT device personality management. The flowchart 800 starts at module 802 with performing common factor aggregation of enriched metadata derived from event parameters to obtain aggregated metadata permutations. An example of an engine that can perform module 802 is the IoT device demographics generation engine 704 of FIG. 7.

The flowchart 800 continues to module 804 with obtaining domain knowledge, including knowledge regarding bad IoT personalities, from a network administration engine. An example of an engine that can perform module 804 is the IoT personality definition engine 706 of FIG. 7, which obtains domain knowledge from the domain knowledge datastore 720.

The flowchart 800 continues to module 806 with defining a personality, including feature values associated with the personality, using the aggregated metadata permutations, the domain knowledge, and prior personality data set feedback from a new personality profile discovery engine. An example of an engine that can perform module 806 is the IoT personality definition engine 706 of FIG. 7.

The flowchart 800 continues to module 808 with classifying the personality using the feature values and IoT personality models, wherein the personality has a signal associated therewith. An example of an engine that can perform module 808 is the personality classification engine 712 of FIG. 7.

The flowchart 800 continues to module 810 with correlating the signal to reach a verdict and, if the personality is a bad personality, generate a bad personality alert for provisioning to the network administration engine. An example of an engine that can perform module 810 is the signal correlation engine 714 of FIG. 7.

The flowchart 800 continues to module 812 with discovering, at the new personality profile discovery engine, new personality data set feedback from the classified personality and the verdict. An example of an engine that can perform module 812 is the new personality profile discovery engine 716 of FIG. 7.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

The invention claimed is:

1. A method, comprising:
analyzing one or more data packets transmitted to or from an Internet of Things (IoT) device over a network to which the IoT device is connected to obtain event parameters;
analyzing the event parameters to determine a context of the IoT device;
determining behavior of the IoT device based at least in part on the event parameters and the context of the IoT device;
obtaining a progressive risk assessment score for the IoT device;
subsequent to obtaining the progressive risk assessment score for the IoT device, updating the progressive risk assessment score based at least in part on analysis of one or more additional data packets; and
sending an alert via the network when it is determined that the progressive risk assessment score exceeds a threshold.

2. The method of claim 1, wherein the event parameters comprise one or more of data and metadata.

3. The method of claim 1, further comprising using a network administration engine, including a graphical user interface, to facilitate one or more of providing data to and receiving instructions from an administrator of the network to which the IoT device is connected.

4. The method of claim 1, wherein a severity of the alert is based on one or more of priorities and rules of an administrator of the network to which the IoT device is connected.

5. The method of claim 1, wherein the alert is a policy violation alert, a threat alert, or an incident alert.

6. The method of claim 1, wherein the one or more data packets are correlated to an event of a particular application being executed on the IoT device.

7. The method of claim 1, wherein the one or more data packets are analyzed using packet header analysis.

8. The method of claim 1, wherein the one or more data packets are analyzed using deep packet inspection (DPI).

9. The method of claim 1, further comprising using activity graphs to update the progressive risk assessment score.

10. A system, comprising:
a processor configured to:
analyze one or more data packets transmitted to or from an Internet of Things (IoT) device over a network to which the IoT device is connected to obtain event parameters;
analyze the event parameters to determine a context of the IoT device;
determine behavior of the IoT device based at least in part on the event parameters and the context of the IoT device;
obtain a progressive risk assessment score for the IoT device;
subsequent to obtaining the progressive risk assessment score for the IoT device, update the progressive risk assessment score based at least in part on analysis of one or more additional data packets; and
send an alert via the network when it is determined that the progressive risk assessment score exceeds a threshold; and
a memory coupled to the processor and configured to provide the processor with instructions.

11. The system of claim 10, wherein the event parameters comprise one or more of data and metadata.

12. The system of claim 10, wherein the system further includes a network administration engine that includes a graphical user interface to facilitate one or more of providing data to and receiving instructions from an administrator of the network to which the IoT device is connected.

13. The system of claim 10, wherein a severity of the alert is based on one or more of priorities and rules of an administrator of the network to which the IoT device is connected.

14. The system of claim 10, wherein the alert is a policy violation alert, a threat alert, or an incident alert.

15. The system of claim 10, wherein the one or more data packets are correlated to an event of a particular application being executed on the IoT device.

16. The system of claim 10, wherein the one or more data packets are analyzed using packet header analysis.

17. The system of claim 10, wherein the one or more data packets are analyzed using deep packet inspection (DPI).

18. The system of claim 10, wherein the processor is further configured to use activity graphs to update the progressive risk assessment score.

19. The system of claim 10, wherein at least a portion of the system is implemented remotely from the IoT device.

20. A computer program product embodied on a non-transitory medium, the computer program product including instructions which, when the computer program product is executed by a computer, cause the computer to carry out a method comprising:
analyzing one or more data packets transmitted to or from an Internet of Things (IoT) device over a network to which the IoT device is connected to obtain event parameters;
analyzing the event parameters to determine a context of the IoT device;
determining behavior of the IoT device based at least in part on the event parameters and the context of the IoT device;

obtaining a progressive risk assessment score for the IoT device;

subsequent to obtaining the progressive risk assessment score for the IoT device, updating the progressive risk assessment score based at least in part on analysis of one or more additional data packets; and sending an alert via the network when it is determined that the progressive risk assessment score exceeds a threshold.

* * * * *